United States Patent [19]

Matsuura et al.

[11] Patent Number: 4,887,568
[45] Date of Patent: Dec. 19, 1989

[54] CERAMIC INSERT FOR DEFINING PRECOMBUSTION CHAMBER IN CYLINDER HEAD

[75] Inventors: Tooru Matsuura; Masato Taniguchi, both of Aichi, Japan

[73] Assignee: NGK Spark Plug Co., Ltd., Nagoya, Japan

[21] Appl. No.: 238,467

[22] Filed: Aug. 31, 1988

[30] Foreign Application Priority Data

Sep. 8, 1987 [JP] Japan .......................... 62-136287[U]

[51] Int. Cl.⁴ ............................................ F02B 19/16
[52] U.S. Cl. .................................... 123/270; 123/285
[58] Field of Search ............... 123/254, 270, 271, 273, 123/275, 281, 282, 285

[56] References Cited

U.S. PATENT DOCUMENTS

| | | | |
|---|---|---|---|
| 3,140,697 | 7/1964 | Peras ................................. | 123/275 X |
| 4,651,692 | 3/1987 | Morita et al. ....................... | 123/270 |
| 4,676,207 | 6/1987 | Kawamura et al. ................ | 123/271 |

FOREIGN PATENT DOCUMENTS

| | | | |
|---|---|---|---|
| 3440565 | 5/1986 | Fed. Rep. of Germany . | |
| 1253280 | 1/1961 | France ................................ | 123/270 |
| 188024 | 10/1984 | Japan .................................. | 123/271 |

Primary Examiner—Tony M. Argenbright
Attorney, Agent, or Firm—Foley & Lardner, Schwartz, Jeffery, Schwaab, Mack, Blumenthal & Evans

[57] ABSTRACT

A cylinder head has an insert assembly defining a precombuation chamber in a cylinder head. The insert assembly includes a domed insert made of ceramics and cast into a cylinder head body. A fuel injection nozzle hole and a glow plug hole are formed so as to open through the domed insert into the precombustion chamber and inclined with respect to a center axis of the precombustion chamber. The domed insert is provided at the inner surface thereof with a flat inner surface portion constituting part of a circular plane of which axis coincides with a center axis of the precombustion chamber and/or a recess constituting part of a truncated cone or a sphere of which axis coincides with the center axis of the precombustion chamber, whereby to eliminate an otherwise occurring sharp edged portion or portions of the domed insert.

3 Claims, 6 Drawing Sheets ns a precombustion chamber in the cylinder head body. The insert assembly includes a domed insert made of ceramics and cast into the cylinder body. The fuel injection nozzle hole and the glow plug hole are so formed as to open through the domed insert into the precombustion chamber and be inclined with respect to a center axis of the precobmustion chamber. The above structure may follow the conventional fashion.

CERAMIC INSERT FOR DEFINING PRECOMBUSTION CHAMBER IN CYLINDER HEAD

BACKGROUND OF THE INVENTION

1. Field of the Invention

The present invention relates to a diesel engine or the like internal combustion engine having a precombustion chamber and more particularly to improvements in or relating to a ceramic insert for defining a precombustion chamber in a cylinder head of an internal combustion engine as a diesel engine.

2. Description of the Prior Art

A precombustion chamber for a diesel engine or the like internal combustion engine has heretofore been defined by metal parts for the reason of the easy machining and low cost. Recently, it has been practiced to use a ceramic insert or inserts for defining the precombustion chamber with a view to improving the thermal efficiency, durability, particulate emission control, etc.

FIG. 9 shows an example of a prior art insert assembly (A) that includes a domed insert (D) defining a nearly semispherical upper part of a precombustion chamber (I) and a cup-like base insert (F). The domed insert (D) is formed with a glow plug hole (C) and an fuel injection nozzle hole (B). The glow plug hole (C) is inclined with respect to the center axis of the precombustion chamber (I). The glow plug hole (C) is inclined so as to have an inner end (J) that makes an angle $\theta_1$ with respect to a plane tangential to the precombustion chamber (I).

In another example of a prior art insert assembly (A) shown in FIG. 11, the fuel injection nozzle hole (B) is drilled by a flat-ended drill and is inclined so as to have an inner end (G) that makes an angle $\theta_2$ with respect to a plane tangential to the precombustion chamber (I).

In the prior art structures, the fuel injection nozzle hole (B) and the glow plug hole (C) are located close to each other and form a sharp angled or edged portion in the domed insert (D), causing a problem that the domed insert (D) that is made of $ZrO_2$ or $Al_2TiO_5$ is likely to chip or break at the sharp edged portion during preparation thereof and furthermore it is likely to be damaged at the sharp edged portion by thermal load applied thereto. Furthermore, since the heat insulating ceramics is generally low in thermal transmission efficiency and therefore a large thermal stress does not occur therein, the domed insert (D) is used as a core during casting of the cylinder head and thereby cast into the cylinder head. For this reason, the domed insert (D) is subjected to compression stresses which are likely to concentrate in the sharp edged portion to cause damages as chipping, cracking, etc. In order to overcome the above disadvantages, it has been tried to chamfer the sharp edged portion of the domed insert (D). However, since the fuel injection nozzle hole (B) and the glow plug hole (C) are inclined with respect to the center axis of the precombustion chamber (I), the chamferring of the sharp edged portion requires a difficult machining work, resulting in a low working efficiency and a high manufacturing cost.

SUMMARY OF THE INVENTION

In accordance with the present invention, there is provided an improved cylinder head which comprises a cast cylinder head body having a fuel injection nozzle hole and a glow plug hole and an insert assembly defining a precombustion chamber in the cylinder head body. The insert assembly includes a domed insert made of ceramics and cast into the cylinder body. The fuel injection nozzle hole and the glow plug hole are so formed as to open through the domed insert into the precombustion chamber and be inclined with respect to a center axis of the precobmustion chamber. The above structure may follow the conventional fashion.

In accordance with the present invention, the cylinder head further comprises means for providing an inner surface of the domed insert with part of a round shape of which axis coincides with the center axis of the precombustion chamber.

The above structure is effective for overcoming the above noted shortcomings and disadvantages inherent in the prior art structure.

It is accordingly an object of the present invention to provide an improved cylinder head for an internal combustion engine, of which ceramic insert defining a precombustion chamber is durable and reliable in operation.

It is another object of the present invention to provide an improved cylinder head of the above described character which can be attained without substantially deteriorating the manufacturing efficiency and increasing the manufacturing cost.

It is a further object of the present invention to provide an improved cylinder head of the above described character which can attain an improved thermal efficiency of an internal combustion engine and a reliable operation of same.

DESCRIPTION OF THE PREFERRED EMBODIMENTS

Figure 1:
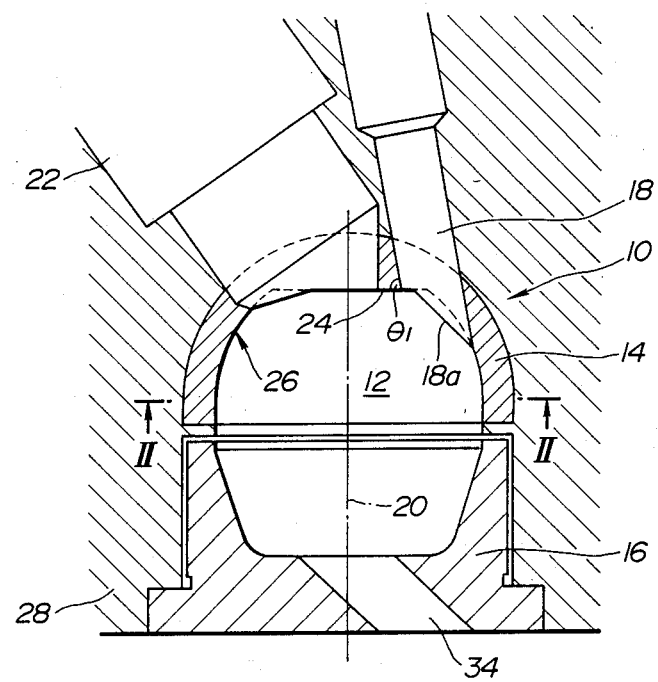
FIG. 1 is a fragmentary sectional view of a cylinder head incorporating a ceramic insert according to an embodiment of the present invention.
Figure 2:
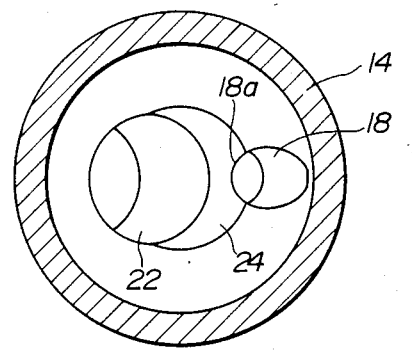
FIG. 2 is a sectional view taken along the line II—II of FIG. 1.

Referring first to FIGS. 1 and 2, a cylinder head is provided with an insert assembly 10 defining a precombustion chamber 12. The insert assembly 10 consists of a domed insert 14 made of an heat insulating ceramics as $ZrO_2$, $Al_2TiO_5$, etc. and a cup-like base insert 16 made of a heat resisrting material as $Si_3N_4$, SUH-3 (heat resisting steel according to Japanese Industrial Standards), etc. The domed insert 14 is formed with a glow plug hole 18 of which axis inclines toward a center axis 20 of the precombustion chamber 12 as it extends upwardly and a fuel injection nozzle hole 22 of which axis inclines away from the center axis 20 as it extends upwardly. The domed insert 14 is formed with a flat inner surface portion 24 constituting part of a circular flat shape of which axis coincides with the center axis of the precombustion chamber 12. The inner surface portion 24 is thus perpendicular to the center axis of the precombustion chamber 12 and provides a planar top to the precombustion chamber 12. By this, the angle $\theta_1$ which the inner surface 26 of the domed insert 14 makes with respect to the inner end 18a of the glow plug hole 18 is increased, thus eliminating an otherwise resulting sharp edged portion that is liable to chip during preparation of the domed insert 14 or melt in use due to thermal load applied thereto and increasing the strength of the domed insert 14.

In manufacture of the cylinder head, a plurality of domed inserts 14 having the flat inner surface portion 24 are prepared and cast into a cylinder head body 28 made of, for example, AC-4B (aluminum alloy according to Japanese Industrial Standards). The cylinder head body 28 is proccessed by heat treatment of T-6 (heat treatment of alluminium alloy according to Japanese Industrial Standards) and formed with the glow plug hole 18 and the fuel injection nozzle hole 22 passing through the domed insert 14 by drilling. The dill used in this embodiment is pointed at the end as will be seen from the drawing. The base insert 16 is then force-fitted in the cylinder head body 28.

Figure 3:
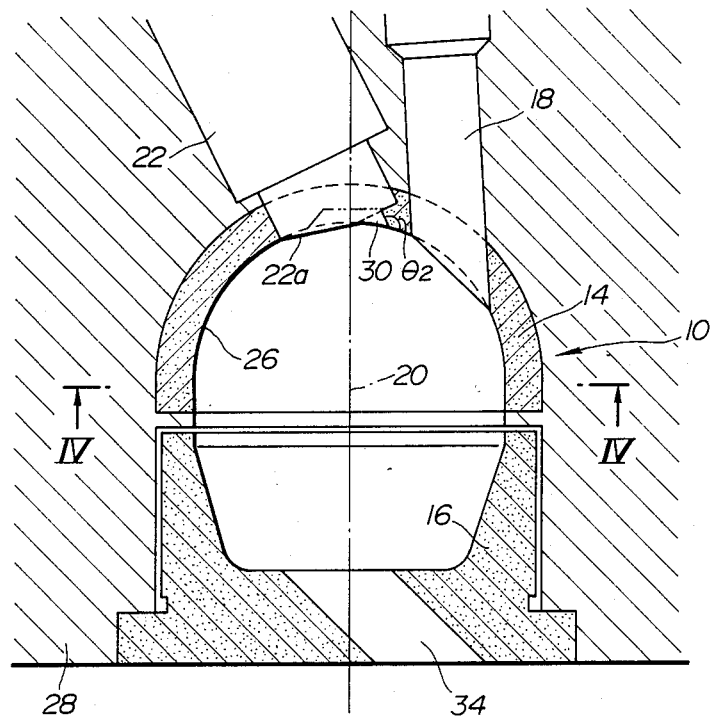
FIG. 3 is a view similar to FIG. 1 but showing another embodiment of the present invention.
Figure 4:
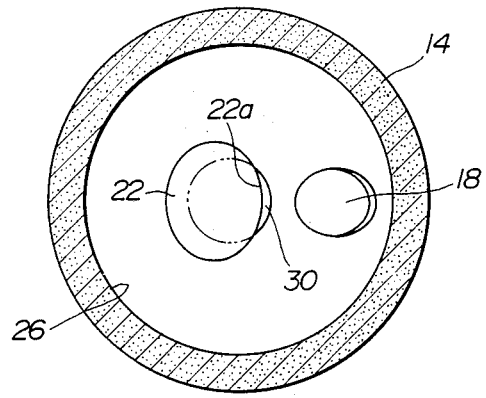
FIG. 4 is a sectional view taken along the line IV—IV of FIG. 3.

FIGS. 3 and 4 show another embodiment in which the domed insert 14 is formed with a recess 30 constituting part of a truncated cone shape of which axis coincides with the center axis 20 of the precombustion chamber 12. By this, the angle $\theta_2$ which the inner surface 26 of the domed insert 14 makes with respect to the inner end 22a of the fuel injection nozzle hole 22 is increased, thus eliminating an otherwise resulting sharp edged portion that is liable to damage during preparation of the domed insert 14 as well as in use and increasing the strength of the domed insert 14.

Figure 5:
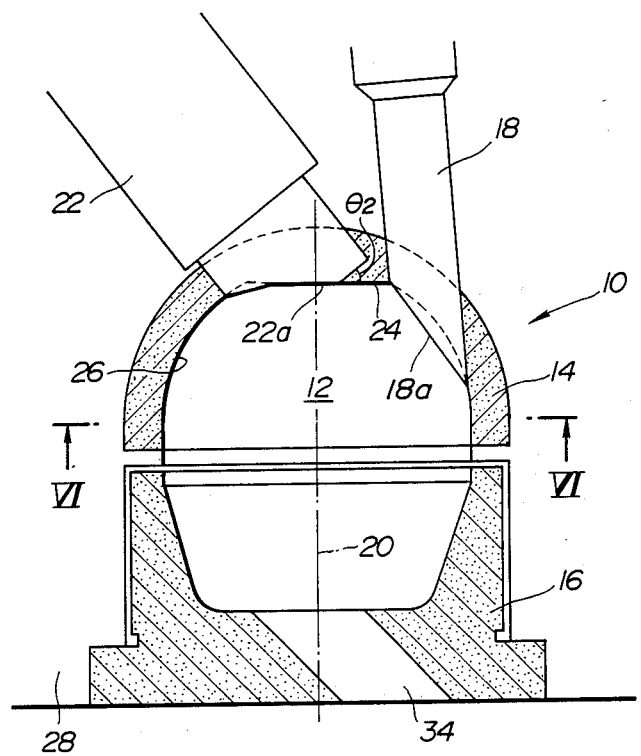
FIG. 5 is a view similar to FIG. 1 but showing a further embodiment of the present invention.
Figure 6:
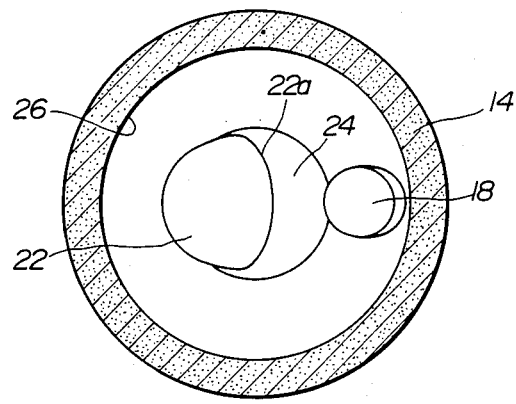
FIG. 6 is a sectional view taken along the line VI—VI of FIG. 5.
Figure 7:
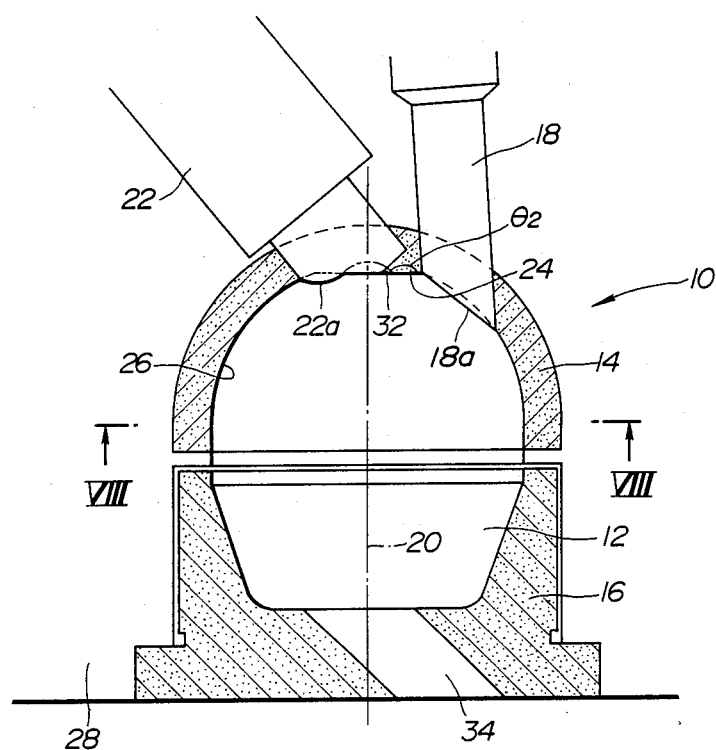
FIG. 7 is a view similar to FIG. 1 but showing a further embodiment of the present invention.
Figure 8:
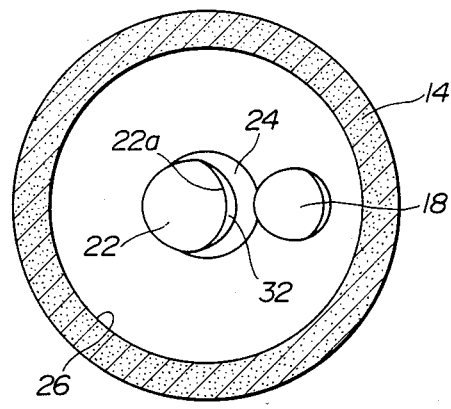
FIG. 8 is a sectional view taken along the line VIII—VIII of FIG. 7.
Figure 9:
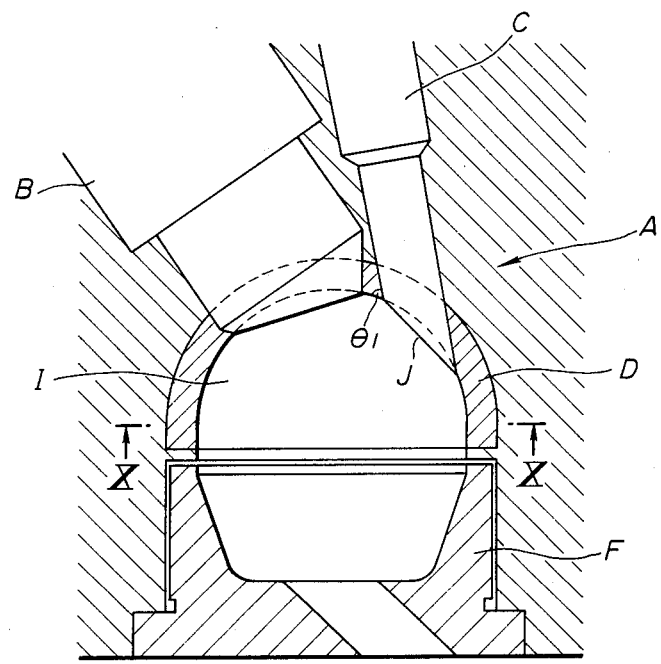
FIGS. 9 and 11 are views similar to FIG. 1 but showing prior art cylinder heads.
Figure 10:
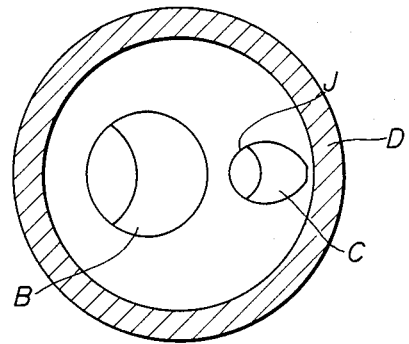
FIGS. 10 and 12 are sectional views taken along the lines X—X of Fig. 9 and XII—XII of FIG. 11, respectively.
Figure 11:
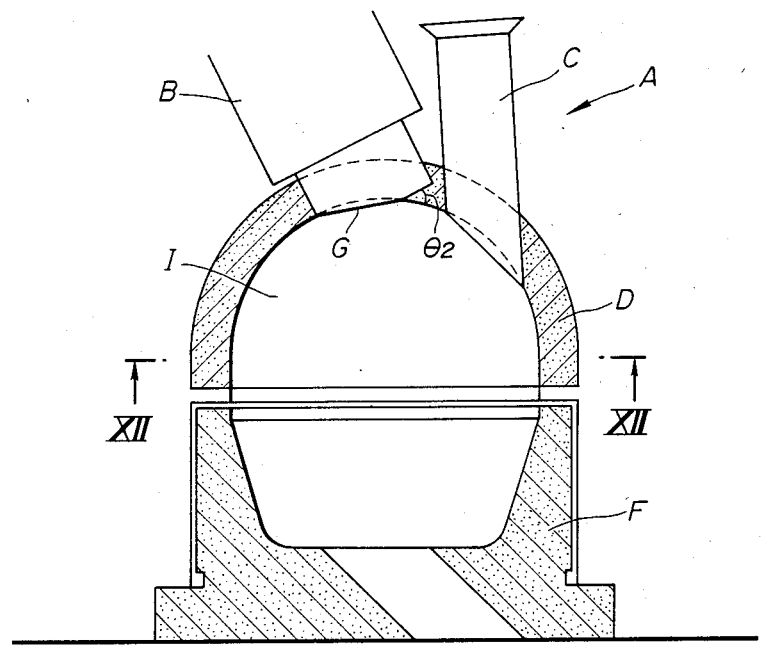
Figure 12:
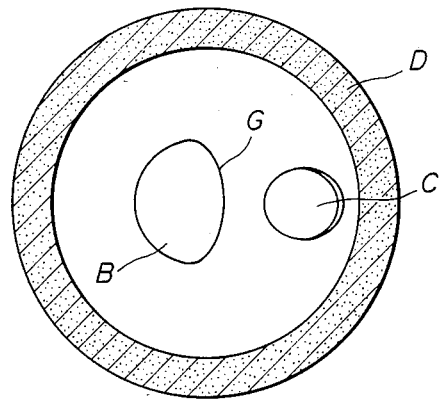

FIGS. 5 and 6 show a further embodiment in which the domed insert 14 is formed with a planar inner surface portion 24 that is perpendicular to the center axis 20 of the precombustion chamber 12 similarly to the previous embodiment of FIGS. 1 and 2. By this, the sharp edged portion formed by the inner end 18a of the glow plug hole 18 and the inner surface 26 of the domed insert 14 is eliminated. However, in this embodiment, the fuel injection nozzle hole 22 is drilled by using a flat-ended drill, i.e., a drill having an included angle of nearly 180°. Due to this, another sharp edged portion formed by the inner end 22a of the fuel injection nozzle hole 22 and the inner surface 26 of the domed insert 14 results. FIGS. 7 and 8 show and embodiment free from this problem.

In the embodiment shown in FIGS. 7 and 8, the domed insert 14 is formed with not only the planar inner surface portion 24 that is perpendicular to the central axis 20 of the precombustion chamber 12 but a recess 32 constituting part of a sphere of which diametral axis is coincident with the center axis 20 of the precombustion chamber 12. By this, not only the angle $\theta_1$ which the inner surface 26 of the domed insert 14 makes with respect to the inner end 18a of the glow plug hole 18 but the angle $\theta_2$ which the inner surface 26 of the domed insert 14 makes with respect to the inner end 22a of the fuel injection nozzle hole 22 is increased.

In the foregoing, it is to be noted that the flat surface portion and the recesses are adapted to constitute part of a round shape of which axis coincides with the center axis of the precombustion chamber, whereby not only the forming of the recesses but the finish cutting of the flat surface portion can be performed at the same time when the domed insert is subject to finishing cut, thus improving the working efficiency.

In the meantime, the recesses 30 and 32 may constitute part of a spherical shape, a conical shape, a truncated cone shape or any other round shape that can be machined symmetrically about the center axis 20 of the precombustion chamber 12. The base insert 16 is formed with a connection passage 34 for connecting the precombustion chamber 12 to, though not shown, a main combustion chamber or a space above a piston of an internal combustion engine.

A four-cylinder 2-liter diesel engine equipped with precombustion chamber units of the present invention was tested for durability under the condition that it run at 4,500 rpm for 500 hours. By this test, nothing defective was found. In contrast to this, when the cylinder head with the conventional precombsution chamber was subjected to the similar test for durability, it was found that damages as chipping, melting, etc. are caused in all of the ceramic inserts adjacent the sharp edged portions thereof.

What is claimed is:

1. A cylinder head comprising:
a cast cylinder head body having a fuel injection nozzle hole and a glow plug hole;
an insert assembly defining a precombustion chamber in said cylinder head body;
said insert assembly including a domed insert made of ceramics and cast into said cylinder body;
said fuel injection nozzle hole and said glow plug hole being so formed as to open through said domed insert into said precombustion chamber and be inclined with respect to a center axis of said precombustion chamber; and
means for providing an inner surface of said domed insert with part of a round shape, the axis of which coincides with the center axis of said precombustion chamber;
wherein said round shape is a truncated cone for thereby providing an inner surface of said domed insert with a recess constituting part of a truncated cone.

2. A cylinder head comprising:
a cast cylinder head body having a fuel injection nozzle hole and a glow plug hole;
an insert assembly defining a precombustion chamber in said cylinder head body;
said insert assembly including a domed insert made of ceramics and cast into said cylinder body;
said fuel injection nozzle hole and said glow plug hole being so formed as to open through said domed insert into said precombustion chamber and be inclined with respect to a center axis of said precombustion chamber; and
means for providing an inner surface of said domed insert with part of a round shape, the axis of which coincides with the center axis of said precombustion chamber;
wherein said round shape is a sphere for thereby providing an inner surface of said domed insert with a recess constituting part of a sphere.

3. A cylinder head comprising:

a cast cylinder head body having a fuel injection nozzle hole and a glow plug hole;

an insert assembly defining a precombustion chamber in said cylinder head body;

said insert assembly including a domed insert made of ceramics and cast into said cylinder body;

said fuel injection nozzle hole and said glow plug hole being so formed as to open through said domed insert into said precombustion chamber and be inclined with respect to a center axis of said precombustion chamber; and means for providing an inner surface of said domed insert with part of a round shape, the axis of which coincides with the center axis of said precombustion chamber, wherein said round shape is a circular flat shape for thereby providing an inner surface of said domed insert a flat inner surface portion constituting part of a circular plane that is perpendicular to the center axis of said precombustion chamber; and second means for providing an inner surface of said domed insert with part of a round shape, the axis of which coincides with the center axis of said precombustion chamber, wherein said round shape of said second means is a sphere for thereby providing the inner surface of said domed insert with a recess constituting part of a sphere in addition to said flat inner surface portion.

* * * * *